Oct. 9, 1962 R. BAKER 3,057,992
FLASHLIGHTS
Filed June 1, 1960
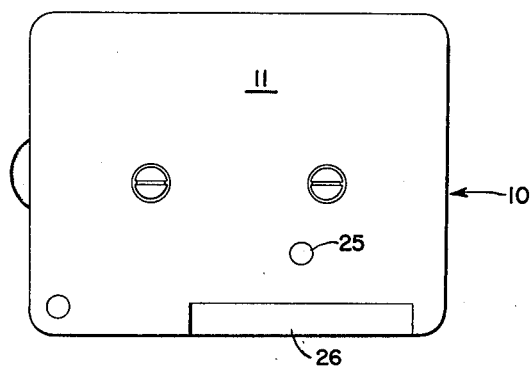
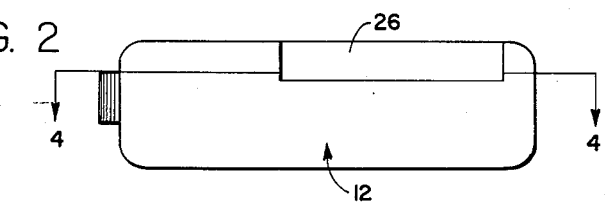
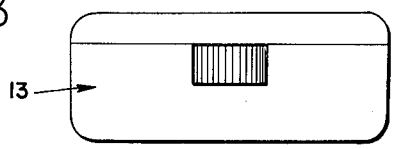
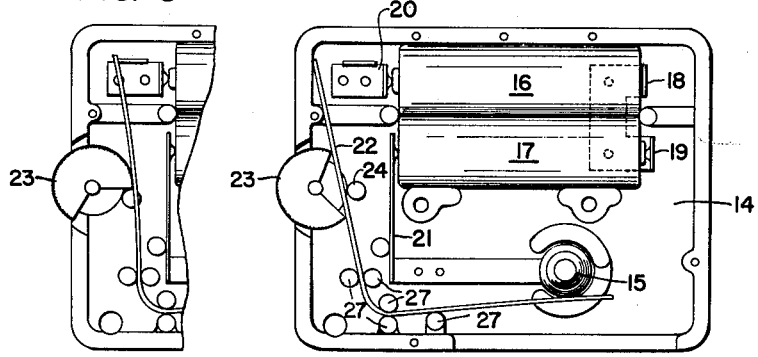
INVENTOR
RIDGWAY BAKER
BY *George W. Field*
ATTORNEY

United States Patent Office 3,057,992
Patented Oct. 9, 1962

3,057,992
FLASHLIGHTS
Ridgway Baker, Minneapolis, Minn., assignor to Minneapolis-Honeywell Regulator Company, Minneapolis, Minn., a corporation of Delaware
Filed June 1, 1960, Ser. No. 33,219
1 Claim. (Cl. 240—10.65)

This invention relates to the field of portable lamps and comprises a flashlight particularly designed for the use of pilots of air and other craft. The retention of suitable dark adaptation is important in piloting aircraft or marine vessels at night, and referring particularly to aircraft, the light in the cockpit is conventionally selected to be of a wave length which exercises minimum disturbance of the pilot's night vision while still allowing him to read the indications of the various meters which he must observe. The general level of light in the cockpit however is not sufficient to permit ready reading of charts, and so forth, and heretofore it has been necessary for the pilot to use some form of extra light such as a flashlight for chart reading purposes. However, the conventional flashlight is ill adapted for cockpit use: its shape makes it unstable so that it does not remain in a position, the light can not be readily contained within a limited area, and the white light destroys or diminishes the pilot's dark adaptation, so that when he looks up from his chart reading his observation of the area surrounding the airplane is reduced.

It is an object of the present invention to provide a portable lamp or flashlight particularly adapted for chart reading use by its geometric configuration, which adapts it to be stably positioned on the chart to be read, and by the provision of a suitable filtering arrangement so that normally the light given is such as to interfere minimally with the pilot's dark adaptation, while at the same time means are provided whereby white light of a considerably higher intensity is readily available if this becomes necessary.

Various other objects, advantages and features of novelty not particularly enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

In the drawing, FIGURE 1 is a bottom view of a device embodying my invention, FIGURE 2 is a side elevational view, FIGURE 3 is an end elevational view, FIGURE 4 is a view similar to FIGURE 1 with the bottom of the unit removed showing the flashlight turned off, and FIGURE 5 is a fragmentary view like FIGURE 4, but showing the flashlight turned on.

As shown in the drawing my flashlight includes a housing 10 including a bottom 11, sides 12 and 13 and a top 14. Within the housing are a lamp bulb 15 and a pair of batteries 16 and 17. The housing is made of a suitable insulating plastic material, and includes metallic brackets 18, 19, 20 and 21 for making electrical connection to batteries 16 and 17. Brackets 18 and 19 may be unitary or may be connected together, and they cooperate with brackets 20 and 21 to connect batteries 16 and 17 in series. Bracket 21 is extended to the lower right for engaging the center contact of lamp 15, and bracket 20 is extended upwardly to the left to comprise the fixed contact of a single pole single throw switch, the movable contact of which is formed by one end of a spring wire 22. Side 13 of housing 10 is apertured to provide access to a knurled cam 23 rotatable about an axis and having abutments to engage a stop column 24 moulded into the housing. The other end of wire 22 presses against the shell of lamp 15, and the wire passes through support columns 27 and engages member 23. Tangential pressure causing rotation of member 23 in a counter-clockwise direction displaces the upwardly extending portion of member 22 into engagement with a portion of bracket 20, thus completing the electrical circuit between batteries 16 and 17 and lamp 15: when pressure on member 23 is released the circuit is interrupted.

As shown in FIGURE 5, rotation of member 23 in a clockwise direction produces sufficient distortion in the outwardly extending portion of member 22 so that it bears upon member 23 in such a fashion as to maintain the member in its rotated position, rather than returning it to normal position; thus continuous operation of member 15 takes place when the knob is thus rotated.

As shown in FIGURE 1, the bottom 11 of housing 10 is perforated at 25, the perforation being aligned with the position of lamp 15, so that light from the lamp may pass through aperture 25. If desired the aperture 25 may be closed by a colorless transparent member. Similarly one side of the housing near its lower portion includes an insert 26 of red transparent plastic which is again generally aligned with the position of lamp 15.

From the foregoing it will be evident that when the lamp is turned on and the unit is laid down on a chart, clipboard or other flat object to be observed, white light through aperture 25 is prevented from escaping, and only light passing through red insert 26 can fall upon the chart. The restricted size of insert 26 restricts the area upon which this colored light can fall, and the color of the material selected, together with the low overall intensity of the light transmitted thereby, result in minimum interference with the pilot's dark adaptation. However, should some situation arise requiring higher intensity illumination, the pilot has only to tilt the device slightly to allow uncolored illumination of the chart, or by picking the flashlight up light can be directed in any desired direction, where the importance of clear vision within the cockpit is sufficient to justify the resultant diminution of the pilot's ability to see in the dark.

Numerous objects and advantages of my invention have been set forth in the foregoing description, together with details of the structure and function of the invention, and the novel features thereof are pointed out in the appended claim. The disclosure, however, is illustrative only, and I may make changes in detail, especially in matters of shape, size and arrangement of parts, within the principle of the invention, to the full extent indicated by the broad general meaning of the terms in which the appended claim is expressed.

I claim as my invention:

A pilot's portable cockpit flashlight comprising, in combination: a lamp bulb; a battery; a thin opaque housing, comprising a bottom with a flat exterior surface and at least one side extending at an angle to the bottom to an extent less than any dimension of said surface, for containing said bulb and said battery, said housing being thus dimensioned for highly stable equilibrium when resting on said surface; light transmitting means of limited area in said bottom spaced from said side and in alignment with said bulb; colored translucent material in both a lower portion of said side and an adjacent portion of said bottom in alignment with said bulb for transmitting light of low intensity and of a wave length having minimal effect on the dark adaptation of an observer; and means electrically connecting said lamp bulb and said battery, including switch means operative from without said housing for energizing said bulb, so that if said housing is laid on a flat map the map may be observed in colored light of low intensity, while said housing may be lifted to provide directed illumination in uncolored light of higher intensity.

References Cited in the file of this patent

UNITED STATES PATENTS

| | | |
|---|---|---|
| 1,104,245 | Charlton | July 21, 1914 |
| 2,119,486 | Muldoon | May 31, 1938 |
| 2,225,825 | Desimone | Dec. 24, 1940 |
| 2,889,450 | Nordquist et al. | June 2, 1959 |